Feb. 7, 1933.　　　A. G. REDMOND　　　1,896,972
ELECTRIC MOTOR
Filed Aug. 12, 1930
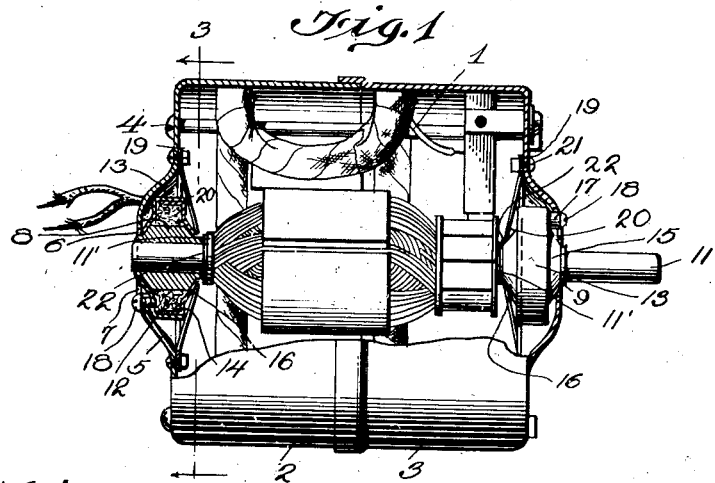
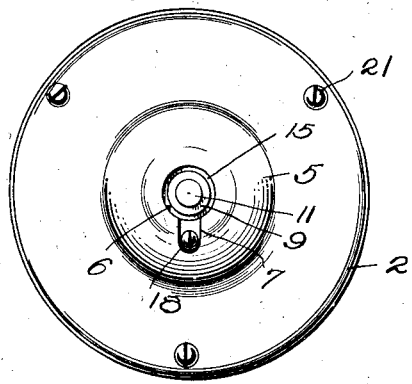 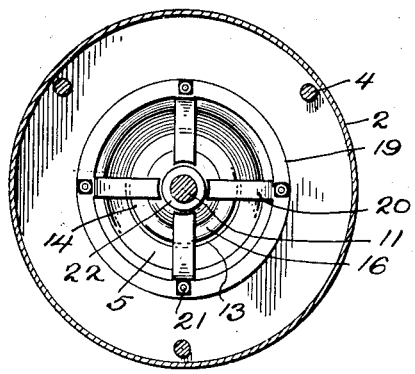
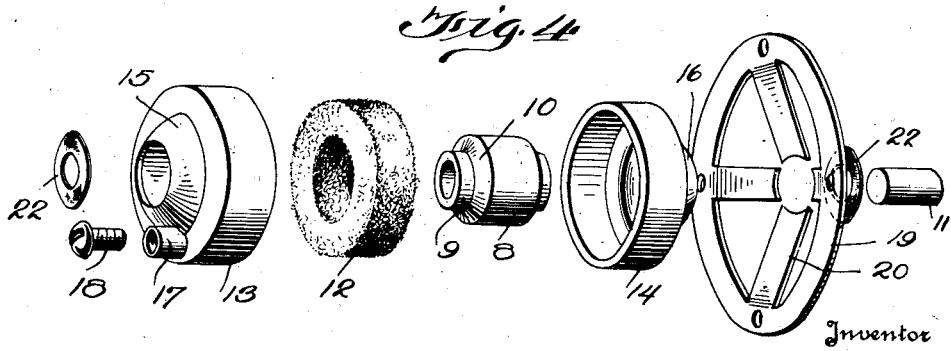
Inventor
A. G. Redmond
By Pattison, Wright & Pattison
Attorneys Patented Feb. 7, 1933

1,896,972

UNITED STATES PATENT OFFICE

ALBERT G. REDMOND, OF FLINT, MICHIGAN

ELECTRIC MOTOR

Application filed August 12, 1930. Serial No. 474,796.

This invention relates to certain new and useful improvements in electric motors and more particularly to the bearing for the armature shaft thereof, the object being to provide a lubricating bearing formed of powdered copper and graphite mounted within a casing and surrounded by a felt ring adapted to absorb the lubricant so as to maintain the bearing thoroughly lubricated.

Another object of my invention is to provide novel means for mounting the bearing in the motor housing whereby a self-aligning bearing is produced.

Another object of my invention is to provide means for eliminating the noise caused by end play of the armature shaft by providing washers formed of canvas impregnated with linseed oil and baked.

A still further object of the invention is to provide an electric motor which is especially adapted to be used in connection with hot water heaters for motor cars where means is provided for taking up the shock of the vibration of the car by having the armature shaft mounted in movable bearings so that the bearings will be self-aligning and by the provision of cushion members, eliminates the noise caused by the end play of the armature shaft.

Other and further objects and advantages of the invention will be hereinafter set forth and the novel features thereof defined by the appended claims.

In the drawing,

Figure 1 is a side elevation, partly in section, of an electric motor constructed in accordance with my invention;

Figure 2 is an end elevation;

Figure 3 is a section taken on line 3—3 of Figure 1; and

Figure 4 is a perspective view of the bearing and its mounting showing the parts thereof separated.

In the drawing 1 indicates an electric motor enclosed within a sectional housing composed of telescoping sections 2 and 3 which are secured together by bolts 4 so that the sections can be separated. The end of each section is provided with a substantially semispherical portion 5 apertured as shown at 6 and provided with a notch as shown at 7 for the purpose hereinafter fully described. As the end of each section is formed exactly alike, the description of one section will be sufficient for both.

My improved construction of bearing comprises a cylindrical bearing 8 which is reduced to form tubular portions 9 with curved shoulders 10, said bearing being formed of powdered copper and graphite and adapted to absorb 20 per cent of its weight in oil so as to form a lubricating bearing for the armature shaft 11 of the electric motor which extends longitudinally through the housing as clearly shown in Figure 1.

The bearing 8 is surrounded by a wool ring 12 which is adapted to be saturated with oil so as to maintain the bearing 8 thoroughly lubricated. The bearing is enclosed in a sectional casing formed of telescoping sections 13 and 14 which form an air-tight casing, the ends of the sections being provided with substantially semi-spherical apertured projections 15 and 16 which are adapted to extend into the substantially semi-spherical end portions of the housing of the motor. The sections 13 are provided with projections 17 forming filling openings which are closed by screws 18, the projections extending into the notches 7 of the housing so as to prevent the bearings from rotating.

The bearings are secured within the semi-circular portions of the housing by retaining members 19 which are in the form of rings having inwardly projecting spring arms 20 which engage the substantially semi-circular portions of the bearing casings so as to hold these bearings within the semi-circular portions of the housing whereby a self-aligning bearing for the armature shaft 11 is provided. The bearing retainers 19 are secured to the inner faces of the end walls of the respective sections of the housing by bolts 21 so that these bearings can be easily and quickly inserted or removed by separating the sectional casings of the housings and removing the bearing retainers from the inside.

In order to compensate for the end play and prevent chattering of the armature shaft caused by the vibration, I provide the armature shaft with collars 11' adjacent each end which are adapted to engage cushioning rings or washers 22 formed of duck impregnated with linseed oil and baked.

In the description I have only described specifically the construction of one bearing for one end of the armature shaft, but as the bearings are constructed exactly alike and retained in position in the same manner, it is thought that the description of one is sufficient for both and anyone skilled in the art can clearly understand the construction of mounting the two bearings for the armature shaft so as to produce a novel form of lubricating bearing as well as a self-aligning bearing.

From the foregoing description it will be seen that I have provided an electric motor with a pair of self-aligning, self-lubricating bearings for the armature shaft, which enables the bearings to align themselves after the sectional housing has been placed in position, the bearings being held movably within the pockets formed in the end walls of the housings by spring members.

What I claim is:

1. An electric motor comprising a housing formed of sections, each section having a substantially semi-spherical portion at each end provided with an aperture through which is adapted to extend an armature shaft, a bearing enclosed in a casing arranged within said semi-spherical portion, said housing being provided with notches, filling projections for said bearing casings arranged within said notches and rings having inwardly extending spring arms carried by the ends of said sections of said housing engaging the casings of said bearings for yieldably supporting said bearings in the ends of said housing.

2. In an electric motor the combination with a sectional housing having a substantially semi-spherical portion at each end provided with notches, of a bearing having a substantially semi-spherical portion mounted in said semi-spherical portion of the housing provided with oil filler projections extending into said notches, a ring carrying inwardly projecting spring arms engaging said bearing and an armature shaft mounted in said bearing.

3. In an electric motor, the combination with a housing having substantially semi-spherical portions at each end, of a casing having a substantially semi-spherical portion arranged in each of the semi-spherical portions of the housing, a bearing arranged within each of said casings having a semi-spherical end portion in contact with the semi-spherical portion of said casing and rings secured to the inner face of the sections of said housing having radial spring arms engaging the inner facing of said casings for yieldably holding the bearings within said housing.

In testimony whereof I hereunto affix my signature.

ALBERT G. REDMOND.